June 29, 1943.
C. J. MALHIOT
2,322,862
WEIGHING MECHANISM
Filed Feb. 3, 1940
3 Sheets-Sheet 1
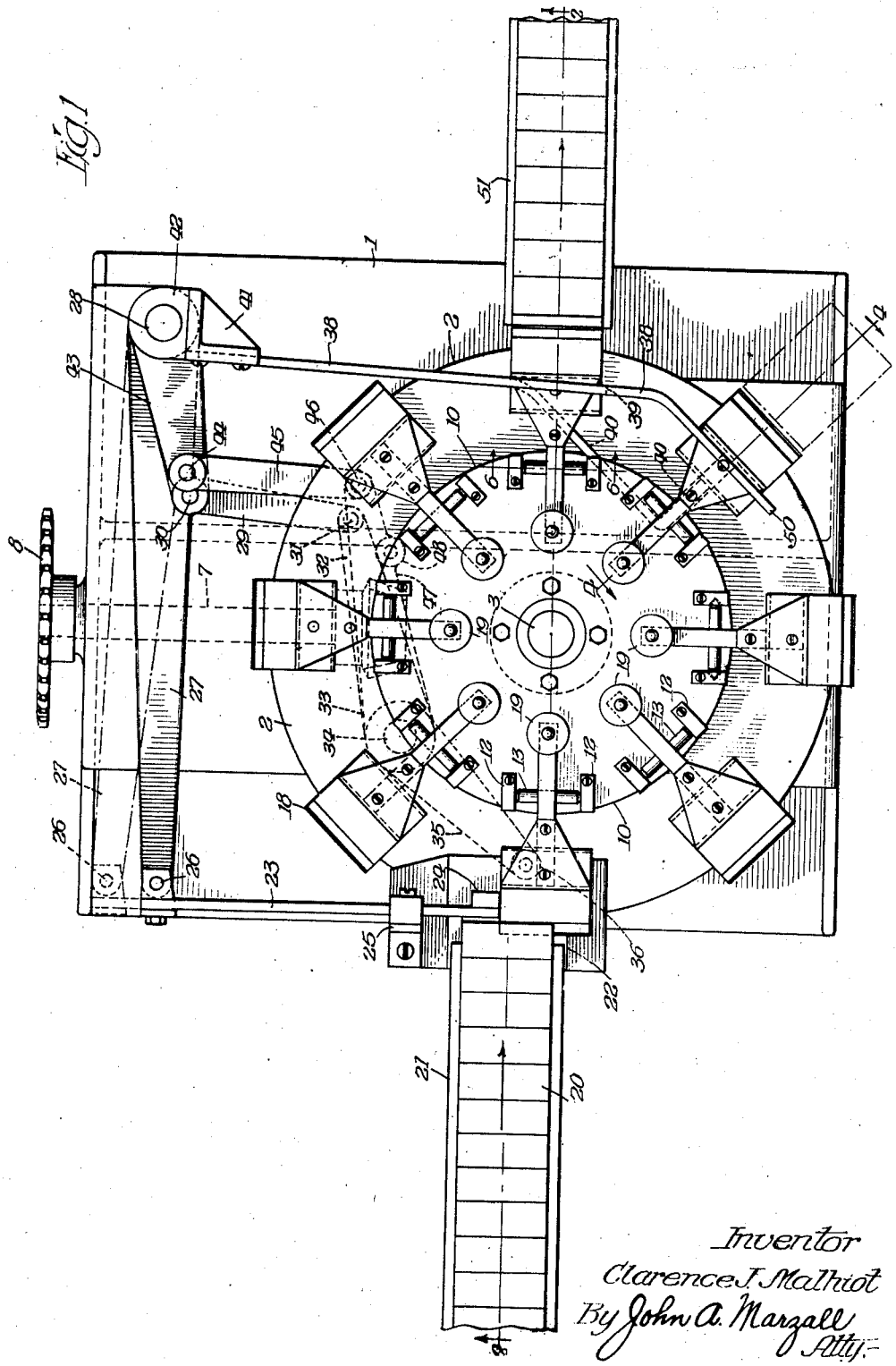
Inventor
Clarence J. Malhiot
By John A. Marzall
Atty.

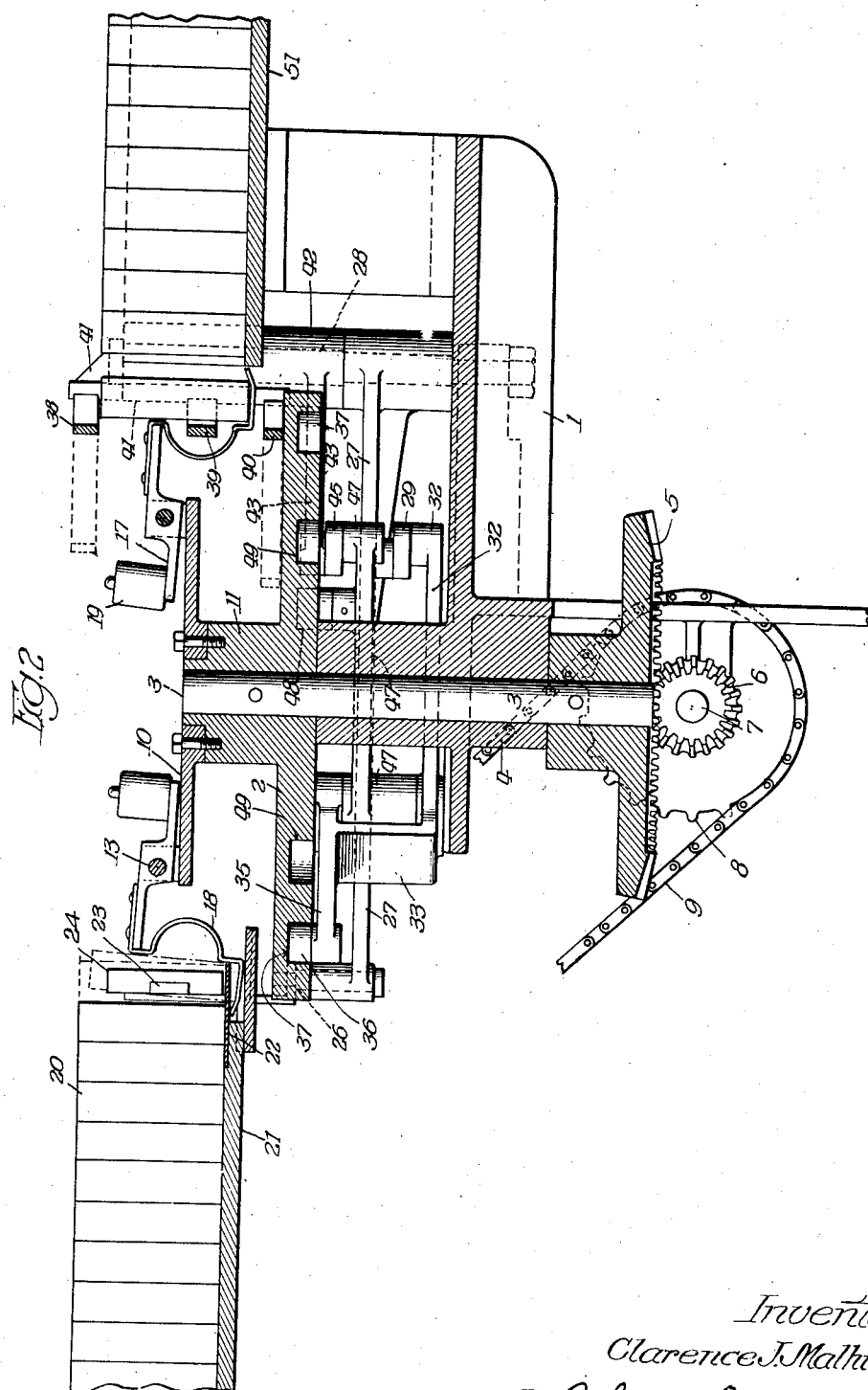

June 29, 1943.            C. J. MALHIOT                2,322,862
                        WEIGHING MECHANISM
                        Filed Feb. 3, 1940            3 Sheets-Sheet 3
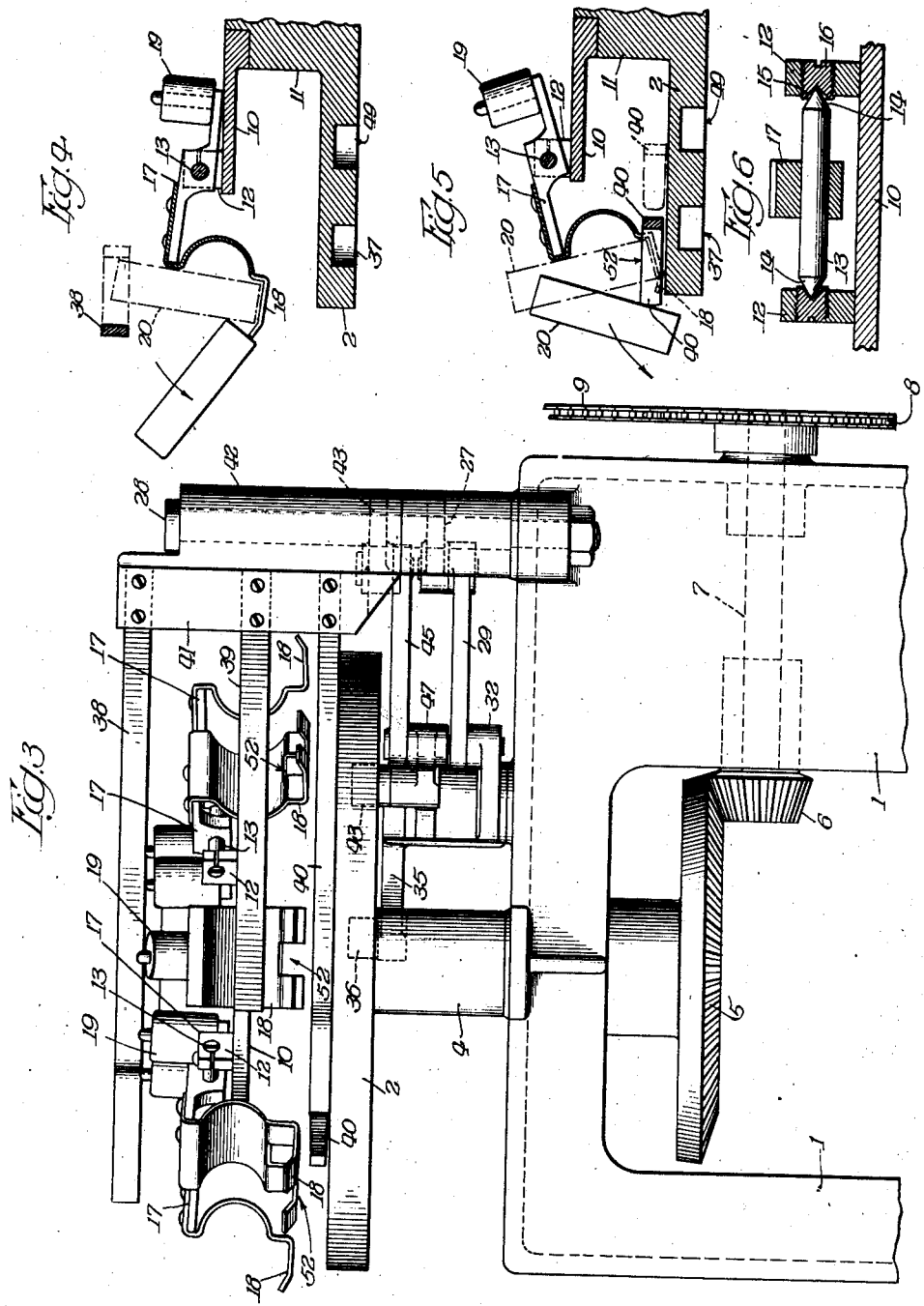
Inventor
Clarence J. Malhiot
By John A. Marzall
           Atty Patented June 29, 1943

2,322,862

UNITED STATES PATENT OFFICE 2,322,862

WEIGHING MECHANISM

Clarence J. Malhiot, Oak Park, Ill., assignor to F. B. Redington Co., Chicago, Ill., a corporation of Illinois Application February 3, 1940, Serial No. 317,124

21 Claims. (Cl. 209—121)

This invention relates to weighing mechanism and to means for discarding overweight and underweight packages and articles.

An important object of the present invention is the provision of new and improved means comprising a compact continuously moving high speed rotary disc or carrier supporting a plurality of individually balanced weighing mechanisms or pockets for consecutively receiving packages to be weighed and for causing overweight or underweight packages to be discharged or ejected from the individual weighing mechanisms at a predetermined position prior to arriving at normal delivery position, whereby packages of only the proper weight will be discharged at the delivery position.

Another important object of the invention is the provision of a continuously rotating member operating in timed relationship with the feeding of a package from a feed trough or conveyor to successively positioned pivoted weighing scale mechanisms which are mounted on the rotating member and then delivering only packages of proper weight to deliver position, overweight or underweight packages being ejected from the weighing mechanisms prior to arriving at delivery position.

Another object of the invention lies in the provision of a mechanism including a continuously rotating high speed element carrying successively positioned weighing devices for receiving packages intermittently from a discharge line, and then causing overweight and underweight packages to be ejected by instrumentality operated coextensively by the rotative movement of the element whereby the packages are continuously weighed as they are received by the weighing mechanisms and delivered or discharged at predetermined positions depending upon whether the packages are underweight, overweight, or the correct weight.

A further object of the invention is the provision of a plurality of elements located and arranged in a particluar manner and operating synchronously in timed relationship to cause proper feeding and positioning of packages successively to proper weighing devices and delivering only packages of a predetermined proper weight to delivery position.

A still further object of the invention is the provision of a weighing mechanism which is adapted to be interposed intermediate a delivery chute, which is provided with means for intermittently feeding packages to receiving position, which is provided with continuously rotating means for bringing successive weighing mechanisms to proper positions to receive packages, and which is provided with means for operating devices to eject over and underweight packages before they attain delivery position.

Another object of the invention is the provision of an over and underweight package ejector and weighing mechanism which operates on a fast moving rotary conveyor of relatively small dimensions conserving considerable space and room over ejecting devices which are arranged in line.

Still another object of the invention is the provision of a relatively small high speed rotary device, including weighing and ejecting means, which is adapted to be positioned at or adjacent the end of the delivery line of packages, the device being relatively small in size requiring very little space and still attaining exceedingly fast operation and accuracy in ejection.

Numerous other objects and advantages will be apparent throughout the progress of the following specification.

The accompanying drawings illustrate a selected embodiment of the invention and the views therein are as follows:

Fig. 1 is a detail plan view of the improved weighing mechanism;

Fig. 2 is a detail longitudinal sectional view on line 2—2 of Fig. 1;

Fig. 3 is a detail elevation view looking from the right toward the left of Fig. 1;

Fig. 4 is a detail sectional view on the line 4—4 of Fig. 1, showing the position of the weighing mechanism when it has received an underweight package;

Fig. 5 is a view similar to Fig. 4 but showing the position of the weighing mechanism when it has received an overweight package;

Fig. 6 is a detail sectional view on the line 6—6 of Fig. 1 showing the pivotal connection of the weighing apparatus.

The particular mechanism or device herein shown for the purpose of illustrating the invention comprises a supporting base or frame 1 upon which there is rotatively mounted a circular cam member 2. A shaft 3 extends through the cam member 2 and through a supporting boss 4 on the machine frame 1 and carries at its lower end a bevel gear 5 which is adapted to be driven by a bevel pinion or gear 6. The pinion or gear 6 is mounted on a drive shaft 7 journaled in suitable bearings in frame 1. A sprocket wheel 8 is fastened to the drive shaft 7 and is driven by a sprocket chain 9 by any suitable mechanism not shown, such as an electric motor. The cam member or plate 2 is, therefore, suitably supported by the frame 1 and is rigidly secured to the shaft 3 and is continuously driven thereby. A scale supporting disc 10 is rigidly secured to an upstanding collar 11 surrounding the shaft 3 and integrally formed with the cam member or plate 2. A plurality of spaced lugs 12 are secured to the disc 10 near the outer edge thereof and support a cross pin 13. The cross pin 13 is provided with pointed ends 14, Fig. 6, which engage conical shaped depressions 15 formed in the screw plugs 16 threadedly mounted in the lugs 12. An arm 17 is rigidly secured to each cross pin 13 and extends outwardly and inwardly radially of the disc 10. The outer end of the arm 17 is provided with a package supporting member 18 while the inner end of the arm 17 is adapted to removably support a weight 19 which is substantially heavy to counterbalance a package of the proper weight on package support 18. Therefore, when a package 20 of the proper weight is received on the support 18, the arm 17 will be counterbalanced, attaining a relatively horizontal position. However, if the package received on support 18 is underweight, the weight 19 will cause the arm 17 to be operated, raising the package supporting end 18 in a manner shown in Fig. 4. However, should the package 20 on support 18 be overweight, it will depress the outer end of the arm and raise the inner end of the arm 17, as clearly shown in Fig. 5.

The weighing device is adapted to cooperate with the discharge end of a package feed so as to insure that the package to be delivered from the delivery end of the machine carries the proper amount of merchandise. The packages 20 are, therefore, delivered to the weighing mechanism by means of a chute, conveyor or other mechanism 21 where they are intermittently moved into position to be received by an individual weighing device spaced circumferentially about the continuously rotating disc 10. The means for moving the packages 20 intermittently along the member 21 may be any means desirable to accomplish the purposes intended but operates synchronously with the rotation of the disc 10. The packages 20 are, therefore, intermittently fed one at a time to the proper position to be received by the package supporting arm 18 and are supported on a supporting plate 22 at the end of the delivery chute or conveyor 21. When a package is in proper position on the plate 22, Fig. 2, and a package supporting member 18 is in proper position with respect to this latter named package, an arm 23 is caused to operate to move the package from the plate 22 onto a package support 18. This intermittent movement of the arm 23 is such that a package will be pushed from the plate 22 into each successive package support 18 as they are continuously moving because of the continuous rotation of the disc 10.

The pusher arm or rod 23 is provided with a pusher head 24 and is slidingly movable through a guide block 25, Fig. 1. The rod 23 is pivotally connected at 26, Fig. 1, to a lever 27 which is pivotally mounted on a stud 28 rigid with a part of the machine frame 1. A link 29, Fig. 1, is pivotally connected at 30 to the lever 27 and at 31 to an arm 32 of a bell crank 33. The bell crank 33 is pivotally mounted on a stud 34 rigidly secured to a part of the frame 1. The arm 35 of the bell crank 33 carries a cam roller 36 at its outer end which is adapted to engage a camway 37 in the bottom of the cam 2, Fig. 2. Thus, during rotation of the disc 10 and the cam 2, the roller 36 will cause the bell crank 33 to operate in accordance with the position and design of the camway 37. The bell crank 33 has its arms 32 and 35 spaced apart vertically, but integrally connected together, as shown in Fig. 2, forming in effect a yoke. The camway 37, however, while being continuous, travels inwardly and outwardly a number of times equal to the number of weighing devices mounted on the disc 10. In the present embodiment shown, there are eight such weighing devices and, therefore, the camway contains eight independent inward and outward positions. The positioning and design of the camway is such that the bell crank 33 will cause the lever 27 to be in discharging position, as shown in Fig. 1, each time a package support 18 is in position opposite the discharging package conveyor or chute 21, as shown in Fig. 1. Between each package discharging position, the lever 27 will be moved to the position shown in dotted lines in Fig. 1, so as not to interfere with the next oncoming weighing mechanism to receive its next package. The cam 2 with its camway 37, therefore, causes packages as they are fed intermittently along the chute or conveyor 21 to be discharged onto a package support 18 as each package support 18 successively reaches receiving position.

It is necessary as well as desirable that each package contains at least the proper amount of merchandise so that the customer is bound to receive a certain amount of merchandise for the price he pays. At the same time and it is desirable from the manufacturer's standpoint that too much merchandise be not given for the normal price of the commodity. Therefore, to satisfy both the purchasing public as well as the manufacturer, it is desirable that the customer receive the amount of merchandise which he expects to buy and receives neither overweight nor underweight amounts. Means, therefore, are provided to eject each overweight and underweight package, permitting only such packages which contain the proper amount of material within certain predetermined limits to be transported to the delivery chute. Means for ejecting overweight and underweight packages as well as for discharging the correct weight packages to the proper delivery chute comprises a plurality of vertically spaced arms 38, 39 and 40, Fig. 2, mounted on a single supporting member 41, Fig. 1. The supporting member 41 is rigidly secured to a sleeve 42 pivotally mounted on the stud 28, Fig. 1. An arm 43 is preferably made integral with the sleeve 42 and has pivoted thereto, as indicated at 44, Fig. 1, a link 45. The link 45 is pivoted at 46, Fig. 1, to a cam lever 47 which is pivotally mounted on the previously mentioned stud shaft 34. A cam roller 48 is pivotally mounted to the cam lever 47 and is adapted to engage a second cam groove 49, Fig. 2, formed in the underside of the cam member 2. This cam groove 49 is spaced inwardly of the cam groove 37, and like the cam groove 37, is so designed as to provide eight separate forward and backward movements to the cam lever 47. The operation of the cam lever 47 is in timed relationship with the rotation of the disc 10 so that the arms 38, 39 and 40 will be caused to operate continuously inwardly and outwardly.

The upper arm 38 is relatively long and has a turned end 50 which is adapted to engage the upper part of an underweight package and cause such underweight package to be discharged off the package support 18. A package which is underweight will be raised by the weight 19 and assume the position shown in Fig. 4. When an underweight package 20 is on the support 18, as shown in Fig. 4, it will strike the turned end 50, Fig. 1, of the upper lever 38. When a package is underweight, the package will be raised as shown in Fig. 4 and then be ejected by the arm 38 before it reaches the final delivery chute 51. The end 50 of the arm 38 is caused to operate outwardly and inwardly from the position shown in dotted lines in Fig. 4 to the position shown in full lines, causing the package to be thrown off the package support 18.

Should the package be overweight, the package support 18 will be depressed as shown in Fig. 5, whereupon the lower arm 40, which extends through a cooperating slot 52, Figs. 3 and 5, in the package supporting member 18, will engage and dislodge the package and cause it to be ejected from the support 18. The arm 40, like the arm 38, is a continuously operating arm moving continuously back and forth and, therefore, before the overweight package reaches the delivery trough 51, the arm 40 which moves from the dotted line position in Fig. 5 to the full line position in that figure will engage the package 20 and dislodge it from the package supporting member 18. Therefore, only packages which are of the proper weight will ever reach the position opposite the delivery chute 51.

As the proper weighted packages arrive at the position immediately opposite the delivery chute 51, the intermediate arm 39 will engage the packages successively substantially intermediate the tops and bottoms thereof and push them off the package support 18 and onto the delivery chute or conveyor 51.

The invention, therefore, provides a machine or mechanism which includes a continuously rotating disc upon which there are supported a plurality of equally spaced package receiving weighing elements. The packages are fed one at a time to each support as it moves to a predetermined position. Means are provided to eject or discharge both underweight and overweight packages while those packages which contain the proper weight are automatically discharged to a package receiving chute or conveyor.

Changes may be made in the form, construction and arrangement of parts without departing from the spirit of the invention or sacrificing any of its advantages, and the right is hereby reserved to make all such changes as fairly fall within the scope of the following claims.

The invention is hereby claimed as follows:

1. Weighing mechanism comprising a rotary disc, weighing elements spaced peripherally about the disc, a package feed trough, means for removing packages successively from the trough and depositing said packages in the elements successively, a cam rotatable with the disc, an arm movable by said cam for discharging packages of proper weight from said elements to delivery position, and means also movable by said cam for ejecting underweight and overweight packages from said elements prior to delivery position.

2. Weighing mechanism comprising a rotary disc, weighing elements spaced peripherally about the disc, means for depositing packages in the elements successively, a cam rotatable with the disc, an arm controlled by said cam for discharging packages of proper weight from said elements to delivery position, an arm pivotally mounted and operated by said cam for ejecting overweight packages from said elements prior to the packages reaching delivery position, and pivoted means spaced above said last named arm and also operated by said cam for ejecting underweight packages from said elements prior to delivery position.

3. In a device of the class described, a main frame, a high speed continuously rotating element, a plurality of weighted members pivotally mounted on said element, feed means for feeding a package successively to each one of the members, operable means including a plurality of shiftable spaced fingers pivotally mounted on said main frame for discharging packages of a predetermined weight from said members at delivery position and for ejecting all other packages from said members prior to arriving at delivery position, and means for operating said last named means to shift said fingers.

4. In a device of the class described comprising a high speed continuously rotating element, a plurality of weighted members pivotally mounted on said element, feed means for feeding a package successively to each one of the members, a cam member movable with the rotating element, a pair of arms operated by the cam to eject packages of a weight other than a predetermined weight from said element, another arm also operated by said cam for discharging packages of a predetermined weight to delivery position, and a common means for causing all of said arms to operate simultaneously.

5. In a device of the class described comprising a high speed continuously rotating element, a plurality of pivotally mounted weighted members mounted on said element, feed means for feeding a package successively to each one of the members, a cam movable with the element and at the same speed, means operated by said cam for operating the feed means, ejecting means operated by said cam to eject packages other than those of a predetermined weight and for discharging packages of a predetermined weight to delivery position, said ejecting means comprising a plurality of vertically spaced arms, and means rigidly connecting said arms together.

6. In a machine of the class described, a relatively fixed support, a continuously moving high speed rotating disc, a plurality of pivoted arms mounted on said disc, a weight on one end of said arm at one side of the pivot, a package carrying support on said arm at the other side of the pivot, means for feeding packages successively to the package carrying supports, means including an arm pivotally mounted on said fixed support for discharging packages at delivery position of a weight substantially to balance said arm, means including other arms pivotally mounted on said fixed support for ejecting all other packages, and oscillating means for operating both of said last named means.

7. In a machine of the class described, a continuously moving high speed rotating disc, a plurality of pivoted arms mounted on said disc, a weight on one end of each of said arms at one side of the pivot, a package carrying support on said arm at the other side of the pivot, a cam rotating with the disc, a feed member operated by the cam to feed a package to each package support successively, oscillatory means operated by the cam, means operated by the oscillating means to discharge all packages of a weight to substantially balance said arm, and means also operable by said oscillating means to eject all other packages from said supports.

8. In a machine of the class described, a frame, a continuously moving high speed rotating disc, arm supports mounted on said disc, arms pivoted intermediate their ends to said arm supports, one end of each arm at one side of the pivot being weighted, a package carrying support on each arm at the other side of the pivot, means for feeding packages successively from a receiving chute to said package supports, shiftable means mounted on said frame for discharging packages of a weight substantially to balance said arm, means operating the shiftable means, the package support end of each of said arms being raised by the weighted end when an underweight package is received in the package support, and means including an arm operated by said shiftable means of the package discharge for ejecting said underweight package before said package arrives at discharge position.

9. In a machine of the class described, a frame, a continuously moving high speed rotating disc, a plurality of arms pivoted between their ends mounted on said disc, one end of said arm at one side of the pivot being weighted, a package carrying support on the other end of said arm at the other side of the pivot, means for feeding packages successively to the carrying supports, oscillatory means mounted on said frame for discharging packages of a weight substantially to balance said arm, means to oscillate the oscillatory means, the package receiving end of the arm being lowered when an overweight package is received, and means including an arm operated by the oscillatory means for ejecting said overweight package before said package arrives at delivery position.

10. In a device of the class described comprising a continuously rotating disc, means for rotating the disc at a high speed, a plurality of spaced supports fastened to said disc adjacent the periphery thereof, an arm pivoted intermediate its end to each support, the inner end of each arm being weighted, a package support carried on the outer end of said each arm, means for feeding an article successively into each package support, movable means including a plurality of interconnected arms for ejecting a package of a weight over or under that required substantially to balance the arm to a horizontal position and to discharge at delivery position all packages of a weight which substantially balances said arm, and means to oscillate said movable ejecting means to oscillate said arms simultaneously.

11. In a device of the class described, a carrier element, means for moving the carrier, a plurality of arms pivotally mounted to the carrier intermediate the ends of said arms, said arms being weighted on one side of the pivot, package carrying supports on the other ends of said arms, means for feeding packages successively to said package carrying supports, ejecting means to eject from the carrying supports at a predetermined position all packages of a weight other than that substantially counterbalancing the arms and for discharging to delivery position all packages of a weight which substantially counterbalance said arms at other predetermined positions, said ejecting means comprising spaced arms, means connecting the arms together, and means for operating all of said last named arms simultaneously.

12. Package weighing and ejecting mechanism comprising a continuously moving high speed rotary support, a cam member operating with the support, package receiving means carried by said support, said package receiving means including weighing means for supporting a package in various positions with respect to said rotary support in accordance with the weight of the package, means controlled by the cam means for supplying a package to successive package supports, shiftable means controlled by the cam for discharging at delivery position packages of a predetermined weight, and means also operated by said cam for ejecting all other packages, said last two named means comprising a plurality of spaced, interconnected, movable arms.

13. An article weighing and ejecting machine comprising a delivery chute and a discharge chute, a rotary conveyor interposed between said chutes, means for rotating said conveyor constantly at a relatively high speed, a cam arranged below the conveyor and rotating with the conveyor, article moving means to move articles successively from the delivery chute and feed them to the conveyor, means operated by the cam to operate the article moving means, means for weighing the articles on the conveyor, movable article ejecting means for ejecting over or under weight articles from the conveyor before the articles arrive at the discharge chute, means operated by said cam for the ejecting means to move the article ejecting means, discharge means for discharging articles of a predetermined weight to the discharge chute, and means operated by said ejecting means to operate the discharge means.

14. An article weighing and ejecting machine comprising a relatively fixed support, a delivery chute and a discharge chute, a rotary conveyor interposed between said chutes, means for rotating said conveyor constantly at a relatively high speed, a cam arranged below the conveyor and rotating with the conveyor, article feeding means to feed articles successively from the delivery chute onto the conveyor, means controlled by the position of the conveyor for operating the feeding means, movable article ejecting means mounted on said fixed support for ejecting articles of an improper weight from the conveyor before said articles arrive at the discharge chute, operating means controlled by said cam for operating the ejecting means, and discharge means operated by said operating means for the ejecting means to discharge articles of a proper weight to the discharge chute.

15. An article weighing and ejecting machine comprising a relatively fixed support, a delivery chute and a discharge chute, a rotary conveyor interposed between said chutes, means for rotating said conveyor constantly at a relatively high speed, article weighing means on said conveyor, means operable in timed relationship with the movement of the conveyor to remove a package from the delivery chute and place it on the weighing means on the conveyor, movable ejecting means mounted on said fixed support for ejecting articles of an improper weight before the articles arrive at the discharge chute, and movable discharge means operable in timed relationship with the speed of the conveyor for discharging articles of a proper weight from the weighing means onto the delivery chute, and means for moving said last two named means simultaneously.

16. An article weighing and ejecting machine comprising a delivery chute and a discharge chute, a rotary conveyor interposed between said chutes, means for rotating said conveyor constantly at a relatively high speed, article weighing means on said conveyor, means operable in timed relationship with the movement of the conveyor to remove a package from the delivery chute and place it on the weighing means on the conveyor, ejecting means for ejecting articles of an improper weight before the articles arrive at the discharge chute, and discharge means operable in timed relationship with the speed of the conveyor for discharging articles of a proper weight from the weighing means onto the delivery chute, said ejecting and discharge means including a plurality of arms mounted on a single pivot member, and means to oscillate said pivot member to operate said arms simultaneously.

17. An article weighing machine comprising weighing means to weigh articles, means to tilt in one direction at an angle inclined to the vertical an underweight article, means to tilt in another direction at an angle inclined to the vertical an overweight article, movable means engageable with the articles only when in tilted position to eject the articles from the weighing means at predetermined positions, movable means for ejecting correct weight articles to another position, said last named means having a common connection with said next to last named means, and means to operate both of said last named means simultaneously.

18. Weighing mechanism comprising a fixed frame, a rotary member mounted on said frame, weighing elements spaced peripherally about said rotary member, means including a package feed for depositing a package on each said element successively, shiftable means movably mounted on said fixed frame for engaging said packages and ejecting underweight, proper weight and overweight packages from said elements, said shiftable means moving into engagement with either underweight and overweight packages to eject the same at a position in advance of the position at which packages of proper weight are ejected, and means for operating said shiftable means in coordinated time relationship with respect to movement of said rotary member.

19. Weighing mechanism comprising a rotary member, weighing elements spaced peripherally about the member, means for depositing packages in the elements successively, a cam rotatable with the member, an arm controlled by said cam for discharging packages of proper weight from said elements to delivery position, an arm pivotally mounted and operated by said cam for ejecting overweight packages from said elements prior to the packages reaching delivery position, and a pivoted arm also operated by said cam for ejecting underweight packages from said elements prior to delivery position.

20. A machine of the character described comprising a frame, a rotary member, a plurality of article receiving and weighing elements carried by said rotary member, rotary cam means carried by said member for rotation therewith, a plurality of cam tracks on said cam means and extending around the rotary axis thereof, shiftable means movably mounted on said frame for feeding articles to said elements, means operated by one of said cam tracks for operating said feeding means, shiftable means movably mounted on said frame for effecting discharge of articles of proper weight, shiftable means movably mounted on said frame for causing ejection of articles of an improper weight, and means operable by at least one other of said cam tracks for operating said discharge means and said ejection means.

21. A machine of the character described comprising a frame, a rotary member, a plurality of article receiving and weighing elements carried by said rotary member, rotary cam means carried by said member for rotation therewith, a pair of cam tracks on said cam means and extending around the rotary axis thereof, shiftable means movably mounted on said frame for feeding articles to said elements, means operated by one of said cam tracks for operating said feeding means, shiftable means movably mounted on said frame for effecting discharge of articles of proper weight, shiftable means movably mounted on said frame for causing ejection of articles of over and under weight, and means operable by the other of said cam tracks for operating said discharge means and said ejection means.

CLARENCE J. MALHIOT.